(12) United States Patent
Pendzich et al.

(10) Patent No.: US 8,840,709 B2
(45) Date of Patent: Sep. 23, 2014

(54) METHOD AND APPARATUS FOR PURIFYING COMPRESSED AIR

(75) Inventors: Kevin Pendzich, Hannover (DE); Heinrich Diekmeyer, Barsinghausen (DE)

(73) Assignee: WABCO GmbH, Hannover (DE)

( * ) Notice: Subject to any disclaimer, the term of this patent is extended or adjusted under 35 U.S.C. 154(b) by 254 days.

(21) Appl. No.: 13/319,000

(22) PCT Filed: Mar. 12, 2010

(86) PCT No.: PCT/EP2010/001560
§ 371 (c)(1), (2), (4) Date: Dec. 1, 2011

(87) PCT Pub. No.: WO2010/136090
PCT Pub. Date: Dec. 2, 2010

(65) Prior Publication Data
US 2012/0067205 A1    Mar. 22, 2012

(30) Foreign Application Priority Data
May 28, 2009 (DE) .......... 10 2009 023 044

(51) Int. Cl.
*B01D 53/02* (2006.01)
*B60T 17/00* (2006.01)
*B01D 53/26* (2006.01)
*F15B 21/04* (2006.01)
*B01D 53/00* (2006.01)

(52) U.S. Cl.
CPC .......... *B01D 53/002* (2013.01); *B01D 2256/12* (2013.01); *B60T 17/004* (2013.01); *B01D 2256/10* (2013.01); *B01D 53/265* (2013.01); *F15B 21/041* (2013.01); *F15B 21/048* (2013.01); *B01D 2257/80* (2013.01)
USPC .................................. 95/257; 95/17

(58) Field of Classification Search
CPC ........ B01D 53/26; B01D 53/265; B01D 5/00; B01D 8/00
USPC ...................................... 95/17, 257
See application file for complete search history.

(56) References Cited

U.S. PATENT DOCUMENTS

| | | |
|---|---|---|
| 2007/0028777 A1 | 2/2007 | Hoffman et al. |
| 2010/0059126 A1 | 3/2010 | Diekmeyer et al. |

FOREIGN PATENT DOCUMENTS

| | | |
|---|---|---|
| DE | 43 13 573 A1 | 10/1994 |
| DE | 103 13 575 A1 | 9/2004 |
| DE | 10 2004 056 954 A1 | 11/2004 |
| DE | 10 2006 035 772 A1 | 2/2008 |
| EP | 0 504 596 A2 | 9/1992 |
| JP | 2000 073978 | 3/2000 |

*Primary Examiner* — Christopher P Jones
(74) *Attorney, Agent, or Firm* — Kramer Levin Naftalis & Frankel LLP

(57) ABSTRACT

In a compressed air processing method and device for motor vehicles, compressed air at static pressure in a pressure line is purified of contaminants, such as hydrocarbon compounds and oil products, and subsequently dried. To ensure that the compressed air is effectively purified of contaminants and water vapor before purification, the compressed air is brought to a temperature at which the contaminants present in gaseous form condense and the water mass contained in the compressed air is dissolved as steam.

7 Claims, 3 Drawing Sheets

METHOD AND APPARATUS FOR PURIFYING COMPRESSED AIR

FIELD OF THE INVENTION

The present invention generally relates to pneumatic consumers, and in particular, to a method and device for processing compressed air for one or more pneumatic consumers.

BACKGROUND OF THE INVENTION

To supply compressed air to pneumatic consumers such as compressed-air brakes of motor vehicles, compressed air supply devices are known, in which the compressor compresses intake air and supplies the air via a pressure line to a storage vessel, and from which the air is extracted as required. In motor vehicle applications, the humidity of the compressed air is undesirable. DE 10 2006 035 772 A1 discloses a compressed air processing device for motor vehicles, in which a dehumidification device is provided in the pressure line such that the compressed air is dried before entering the storage vessel.

The compressed air is however also often contaminated with damaging matter from the intake air and with oil products and oil decomposition products from the compression process of the compressor, which is usually lubricated with oil. These contaminants—which are present in the compressed air in addition to the water—will for simplicity hereinafter be referred to as oil products. A large proportion of the oil products is present as aerosol, which moves with the compressed air and can therefore pass into the entire compressed air system. There, the oil products can lead to damage, for example as a result of the swelling, sticking or decomposition of seal elements. To protect the compressed air device, and the compressed air units connected thereto, against contamination with oil products, the compressed air in the pressure line is generally purified of oil products.

Here, solutions for the processing of the compressed air have already been proposed in which the purification of the oil takes place before the drying. Here, it is known for a separate filter, for example a coalescence filter or an oil separator, to be provided as a device for oil purification. However, it has proven to be disadvantageous that separated oil products can be vented into the environment. Oil separators operating according to the cyclone principle separate only aerosols of a particular size and therefore, in many applications, do not permit adequate purification performance. In particular, however, the filtering of the compressed air before it flows through the dryer has the effect that the device for oil purification is impinged on both with oil products and also with water. The filter element therefore separates a considerable amount of liquid as a mixture of oil and water, which must be disposed of in considerable quantities, which in turn necessitates frequent servicing of the filter, and under some circumstances impairs the function thereof.

It has also already been proposed that the oil purification first be carried out downstream of the drying agent. DE 103 135 75 A1 discloses a cartridge device for an air dryer, in which the means for removing damaging chemical compounds, in particular hydrocarbon compounds, is positioned downstream of the drying agent with respect to the flow direction of the air. The fact that filtration first takes place downstream of the drying agent, however, often leads to excessive contamination of the drying agent, which significantly reduces the drying performance.

SUMMARY OF THE INVENTION

Generally speaking, it is an object of the present invention to provide a compressed air processing device and a method for generating compressed air for a pneumatic consumer, which ensure that the compressed air is purified of oil products and water vapor in an effective manner without separated oil products being vented into the environment, and which can be implemented in motor vehicles using simple means.

According to one aspect of the invention, the compressed air is first purified of oil products and is subsequently dried. Prior to the purification for the removal of oil, the compressed air is brought to a temperature such that the hydrocarbon compounds condense and the water mass contained in the compressed air is dissolved as steam. Here, the compressed air is purified of oil by filtration at a selected temperature at which the oil products are completely condensed and are therefore present as aerosols or in liquid form which can be easily filtered, and at which the water is still dissolved, as water vapor, in the compressed air and passes through the filter. The water vapor may then be removed from the compressed air in an effective manner using simple means during the subsequent drying.

According to another aspect of the invention, the temperature must be selected to be sufficiently high that, allowing for the ambient conditions and the respective compression, the humidity of the compressed air of the compressed air supply system still remains dissolved in the compressed air as water vapor. At the same time, the temperature must be selected to be sufficiently low that the oil products are completely or almost completely condensed. An ambient temperature of, for example, −40° C., and an inlet temperature of, for example, −15° C. during the purification for the removal of oil is regarded as being an advantageous temperature value. At an ambient temperature of 20° C., the inlet temperature may advantageously be 70° C., and at an ambient temperature of 40° C., the inlet temperature may be 100° C. The pressure line and the devices and assemblies possibly arranged therein are coordinated with one another such that the compressed air temperature, at which oil is condensed and the entrained water remains dissolved as steam, prevails at the inlet of the processing device. That is, it prevails upstream of the device for removing oil products with respect to the throughflow direction.

According to yet another aspect of the invention, during the separation or filtering of oil and the water separation which takes place separately therefrom, only a relatively small amount of oil products is present, which is easier to handle and simpler to dispose of. The water, which is generally separated in larger quantities, is clean and can be vented into the environment. Furthermore, as a result of the processing of the compressed air, the dryer or the drying agent stored in the dryer is reliably protected. If the drying unit is formed as a cartridge with drying agent stored therein, the servicing intervals of the cartridge are considerably lengthened, or the cartridge need no longer be exchanged at all. Since the processing of compressed air is extremely efficient with regard to the oil separation, coarse filtering in the drying agent cartridge can be dispensed with entirely, such that components of simpler design are adequate for complete processing. Furthermore, with the compressed air purification for the removal of oil, the entrained oil is completely collected and disposed of, such that no oil products pass into the environment. In this way, allowance is made for the increasing demands on motor vehicles with regard to environmental protection.

According to an aspect of the invention, the temperature level that leads to the condensation of only the oil aerosols can be set, allowing for the compressor characteristic and the compression, by means of the design of the pressure line. For this purpose, the line length, the line cross section, the thermal conductivity and capacity of the pressure line are correspondingly selected, and the profile thereof, when laid in the vehicle, is selected such that the pressure line generates the desired compressed air temperature.

According to one embodiment of the invention, a device that influences the temperature of the compressed air is advantageously arranged in a portion of the pressure line that is situated upstream of the device for removing oil with respect to the throughflow direction. Through the use of this device, the temperature at the inlet of the filter unit is set to the level, at which the oil products are present as aerosols and the water vapor remains dissolved in the compressed air. Since the compressed air is heated up when compressed by a compressor, a cooler unit is employed to influence the temperature of the compressed air to set the compressed air to the temperature level. For this purpose, in a particularly advantageous embodiment of the invention, a control or regulating unit is provided which, in order to regulate or control the temperature, actuates the cooler as a control element.

In one advantageous embodiment of the invention, the compressed air is additionally cooled after the purification, in order that the subsequent drying can take place in an effective manner. Firstly, during the cooling process, water is condensed and can be directly vented as a liquid. Secondly, the further drying process (lowering of the dew point) is more effective at lower temperatures. If, in the case of an ambient temperature that lies considerably above the freezing point, the inlet temperature is lowered as close as possible to the ambient temperature, whereas in the case of a low ambient temperature, an inlet temperature of 25 . . . 30 K above ambient temperature is expedient, freezing of the dryer as a result of the formation of ice is prevented.

The purification of the compressed air for the removal of oil advantageously takes place by filtration, though other processing techniques may alternatively be used, for example the provision of an oil separator. As a filter, use may advantageously be made of a coalescence filter, which is a cost-effective filter option. The coalescence filter may expediently be part of an air processing unit (APU), such that a compact component is provided, into which also the drying unit and if appropriate, further components are integrated according to the performance capability of the APU. The APU combines the purification for the removal of oil, the dryer and also the associated cooling in a compact housing, such that the number of components of the pressure supply device is considerably reduced. The compact design meets the increasing requirements for use in motor vehicles, where there is often only a very small amount of installation space for accommodating the devices to be supplied with compressed air. Furthermore, simple and fast installation is possible as a result of the reduced number of components in the air processing unit.

According to a further aspect of the invention, the efficiency of the separation of the purification of the compressed air for the removal of oil and the subsequent water separation permits the use of components which can be of simple construction in comparison with the conventionally used assemblies, and which can be designed exclusively with regard to their respective purpose.

A design of the oil filter as a cartridge has the advantage, aside from being easy to handle and install, that only the oil filter needs to be exchanged at regular intervals.

In a further advantageous embodiment of the invention, a shut-off valve is situated in the pressure line between the filter unit and drying unit, and serves to maintain a pressure in the portion from the compressor to the shut-off valve when the air dryer of the drying unit is vented for the purpose of regenerating the drying agent. In this way, firstly, a situation is prevented in which, during the venting process, contaminants from the filter unit(e.g., the oil filter or oil separator) are carried along into the downstream line portion as a result of the high flow speeds occurring during the process. Secondly, during a regeneration, the pressure at the filter unit is maintained, and in this way, energy is saved for restoring the pressure level after the regeneration. The shut-off valve may be externally controlled by an electronic air processing means, or may also be of self-controlling design.

Still other objects and advantages of the present invention will in part be obvious and will in part be apparent from the specification.

The present invention accordingly comprises the several steps and the relation of one or more of such steps with respect to each of the others, and embodies features of construction, combinations of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

Exemplary embodiments of the invention will be explained in more detail below with reference to the appended drawings, in which.

In the figures of the drawings and in the following description, the same reference numerals are used in each case for identical components and devices.

DETAILED DESCRIPTION OF THE PREFERRED EMBODIMENTS

Figure 1:
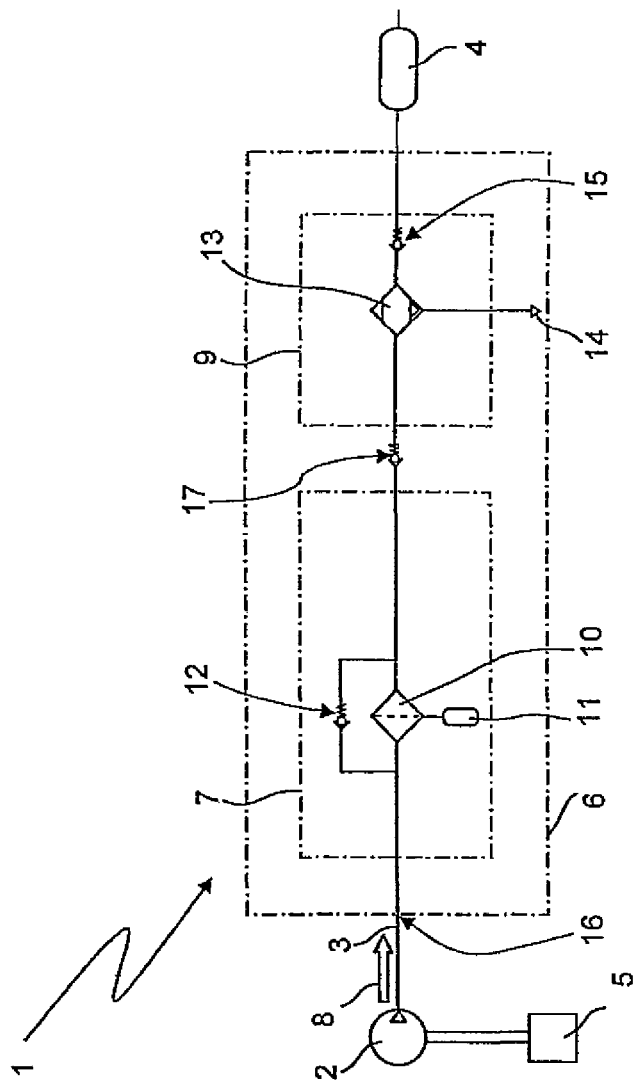
FIG. 1 shows a fluid-circuit diagram of a compressed air processing device according to an embodiment of the present invention.

FIG. 1 shows a compressed air supply device 1 for a motor vehicle. The compressed air supply device comprises a compressor 2 that sucks in and compresses ambient air, and that is connected via a pressure line 3 to a storage vessel 4. Assemblies (not illustrated) of a motor vehicle are connected to the storage vessel and, as consumers, are supplied with compressed air from the storage vessel. The compressor is driven by an engine 5, which may, for example, be the drive engine of the motor vehicle.

Provided in the pressure line 3 is a device 6 for processing the compressed air, the device includes a filter unit 7 and a drying unit 9 that is situated downstream of the filter unit 7 with respect to the throughflow direction 8 of the pressure line 3. The filter unit 7 comprises a coalescence filter 10, which is arranged in the pressure line 3, for collecting contaminants, in particular oil products. Here, a vessel 11 for collecting the filtered-out oil is assigned to the filter 10. The coalescence filter 10 accumulates aerosols and also oil products present in liquid form. Liquid oil products pass either directly from the oil-lubricated compressor into the compressed air or condense on the wall of the pressure line. The pressure line is equipped with a bypass line (bypass) for the coalescence filter 10, and a check valve 12 is arranged in the bypass. The check valve 12, in a manner known per se, opens the bypass when the response pressure is reached, such that the pressure level at the coalescence filter 10 is reduced.

The compressed air which has already been purified of oil aerosols is dried in the drying unit 9. In the exemplary embodiment shown, the drying unit 9 has an air dryer 13 that is arranged in the pressure line 3, and that has a drain valve, wherein the condensed and separated entrained water from the compressed air is discharged via an outlet 14. Within the drying unit 9, a check valve 15 is provided in the pressure line 3 between the air dryer 13 and the storage vessel 4, which check valve maintains the working pressure in the storage vessel 4.

The pressure line 3, in its portion between the compressor 2 and the filter unit 7, is configured such that the compressed air at the inlet 16 of the compressed air processing device 6 is brought to such a temperature at which the entrained oil in the compressed air is condensed, and the water mass also contained in the compressed air is dissolved as steam. In this way, the oil products of the compressed air are filtered out in the filter unit 7, whereas the water vapor flowing through is subsequently removed from the compressed air in the drying unit 9. The temperature of the compressed air in the pressure line 3 is higher than the ambient temperature owing to the compression in the compressor 2. The temperature level that leads to the condensation of only the oil aerosols can be set, allowing for the compressor characteristic and the compression, by means of the design of the pressure line 3. For this purpose, the line length, the line cross section, the thermal conductivity and capacity of the pressure line are correspondingly selected, and the profile thereof, when laid in the vehicle, is selected such that the pressure line generates the desired compressed air temperature. The check valve 12 in the filter unit 7 limits the pressure at the inlet 16 of the compressed air processing device 6, and has a contributory effect in ensuring a continued supply of compressed air to the consumers even in the event of a blockage of the filter. In the event of a blockage, the pressure at the inlet 16 rises. When a predetermined pressure value is reached, the check valve 12 opens and opens up the bypass.

To obtain effective water separation in the drying unit 9, a cooling—device (not shown) is provided in the pressure line 3 between the filter unit 7 and the drying unit 9. The cooling device promotes the condensation of the water vapor in the line section before the inlet into the drying unit 9.

The coalescence filter 10 may be designed as a cartridge, such that an easily exchangeable component is provided. Here, the filter cartridge may be a constituent part of an air processing unit (APU) which is of compact construction and which also comprises the air dryer and the storage vessel 4.

A shut-off valve 17 is arranged in the pressure line 3 between the filter unit 7 and the drying unit 9, which shut-off valve serves to keep the portion from the compressor to the shut-off valve 17 under pressure when the air dryer 13 is vented for the purpose of regenerating the drying agent.

Figure 2:
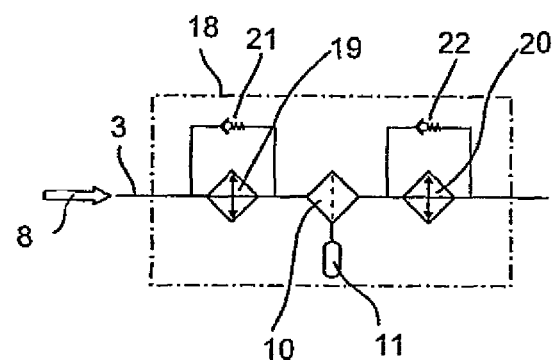
FIG. 2 shows a fluid-circuit diagram of an alternative design of a compressed air processing device according to an embodiment of the present invention.

FIG. 2 shows an alternative design of the filter unit 18 which, in the illustration shown in FIG. 1, may be used instead of the filter unit 7 provided therein. In the filter unit 18 according to FIG. 2, in each case one cooler 19 and 20 is arranged upstream and downstream of the coalescence filter 10 with respect to the throughflow direction 8 of the pressure line 3. The coolers lower the temperature of the compressed air flowing therethrough. Each of the coolers is assigned one bypass of the pressure line 3, the bypasses being shut off in each case by a check valve 21 and 22. The check valves 21, 22 open in the throughflow direction 8 if the respective cooler 19, 20 becomes blocked, for example as a result of icing. The cooler 19 situated upstream of the coalescence filter 10 with respect to the throughflow direction 8 lowers the temperature of the compressed air, which is compressed and thereby simultaneously heated by the compressor, to the temperature level at which oil products in the compressed air condense but water vapor remains dissolved owing to the still adequately high temperature level. The cooler 20 arranged downstream of the coalescence filter 10 with respect to the throughflow direction 8 lowers the temperature level of the compressed air that has been purified of oil products, such that after the oil filtration, the water vapor is rapidly condensed, and the drying takes place in a highly effective manner. The lowering amounts to, for example 25 K. Before entering the drying unit 9 (FIG. 1), which is not illustrated here, downstream of the filter unit 18, the compressed air contains only moisture, the moisture being separated in the drying unit 9, such that the drying unit is protected against damaging oil products.

The oil products filtered out of the coalescence filter 10 are collected in the storage vessel 11 and can thus be disposed of in a simple manner at regular intervals. In the case of pressure supply devices in motor vehicles, the collection of the oil products firstly permits the use even of compressors which release oil products and oil decomposition products into the compressed air during their compression process. The products can specifically be completely collected as a result of the oil filtration, and an escape of the products into the environment can be consistently counteracted. Secondly, the complete collection of the oil products and the prevention of an escape into the environment already makes allowance now for the possible legal restrictions on the overall pollutant emissions of a vehicle, and not only the exhaust-gas emissions thereof.

Figure 3:
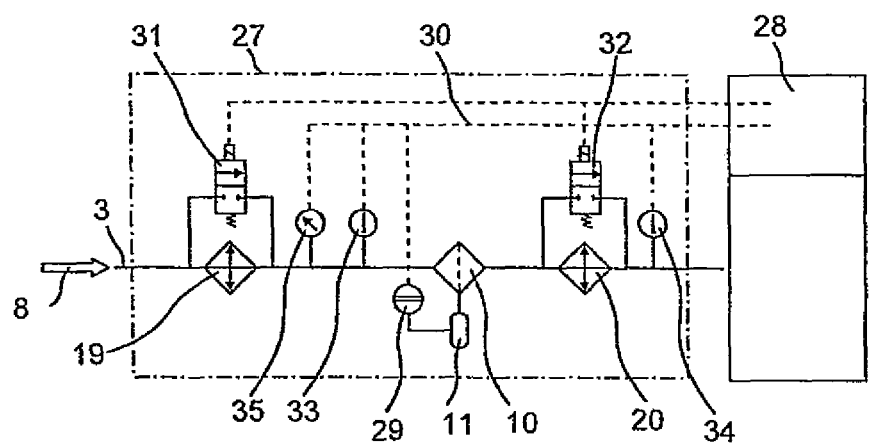
FIG. 3 shows a fluid-circuit diagram of yet another alternative design of a compressed air processing device according to an embodiment of the present invention.

FIG. 3 shows a filter unit 27 for processing compressed air for an electronically controllable compressed air supply device. The compressed air supply device is assigned an electronic control unit 28 which controls the processing of the compressed air in the pressure line 3. The filter unit 27 is arranged, in the manner shown in FIG. 1 and described correspondingly, in the pressure line 3 between the compressor and the drying unit. The filter unit 27 comprises a coalescence filter 10, to which is assigned, in the manner already described, a collecting vessel 11 for collecting the separated oil products. The filling level of the collecting vessel 11 is detected by a liquid level sensor 29. In the exemplary embodiment shown, the liquid level sensor 29 is connected to the electronic control unit 28 via a signal line 30, such that the control unit 28 can detect the filling level of the storage vessel and, if required, display a prompt to empty the vessel 11.

Coolers 19, 20 are arranged in each case upstream and downstream of the coalescence filter 10 with respect to the throughflow direction 8 of the pressure line 3. Both coolers 19, 20 are assigned, similarly to the embodiment as shown in FIG. 2, a bypass line of the pressure line 3. In each case one control valve 31, 32 is arranged in the bypass lines, the control valves being actuated by the control unit 28 via signal lines 30. In the exemplary embodiment shown, the control valves 31, 32 are designed as 2/2 directional control valves, such that, as a function of the switching state of the control valves 31, 32, the control unit 28 can conduct the compressed air as required through the respective cooler 19, 20 or, bypassing the cooler, through the respective bypass lines. It is alternatively possible, for example, for valves which automatically switch in a temperature-dependent manner to be used instead of the externally actuated control valves 31, 32.

The control valve 31 situated upstream with respect to the throughflow direction 8 is operated by the control unit 28 as a control element for controlling the compressed air temperature upstream of the coalescence filter 10. To set the compressed air temperature, in the case of which there prevails at the inlet of the coalescence filter 10 a temperature at which the oil products are condensed but the water vapor remains dissolved in the air flow, the inlet temperature upstream of the filter 6 is measured by means of a temperature sensor 33 as a control variable and is adjusted to the predefined setpoint value by activation and deactivation of the cooling. The activation of the cooling takes place in the present exemplary embodiment by closing the control valve 31, such that the compressed air to be purified is forced through the operating cooler 19. For the deactivation of the cooling, the control valve 31 is correspondingly switched by the control unit 28 into a pass-through position. As an alternative to control, regulation of the inlet temperature of the coalescence filter 10 may also be provided.

The cooler 20 situated downstream of the filter 10 is used by the control unit 28 in a corresponding way, which control unit, to set a predefined outlet temperature of the filter unit 27, detects the outlet temperature of the second cooler 20 by means of a temperature sensor 34 arranged downstream of the cooler 20. The desired outlet temperature, at which effective drying of the compressed air is obtained, is set by corresponding actuation for opening/closing the control valve 32 of the second cooler 20.

In the region of the air inlet of the filter 10, that is, between the intermediate cooler 19 and the filter 10, a pressure sensor 35 is provided in addition to the temperature sensor 33. The measurement signal from the pressure sensor 35 is supplied to the control unit 28. The measurement, which is possible by means of the signal of the pressure sensor 35, of the back pressure upstream of the filter 10 may be used to check for correct functioning of the oil filtration or also for determining the filter exchange interval. Alternatively, the pressure sensor 35 or a further pressure sensor is arranged upstream of the intermediate cooler 19.

The filter unit 27 is combined with a drying unit 9 (FIG. 1) in a compact unit which is controlled by the control unit 28. This is therefore referred to as an electronically controlled air processing unit (E-APU). Such an air processing unit may also comprise further components, such as for example a protective valve for protection of the different compressed air circuits.

Figure 4:
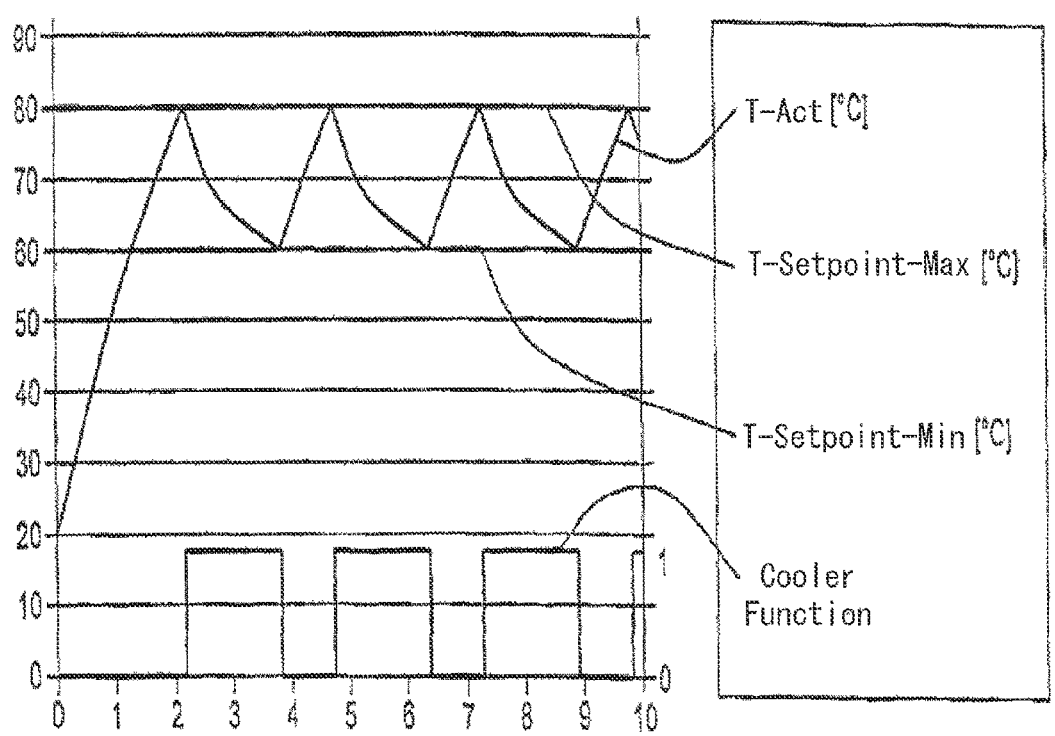
FIG. 4 shows a graphic illustration of a profile, with respect to time, of the inlet temperature of compressed air before purification thereof for the removal of oil according to an embodiment of the invention.

FIG. 4 shows a graphic illustration of the profile of the temperature of the compressed air upstream of the oil filter, the functioning of the control of the compressed air processing by means of the temperature of the compressed air. The graphic temperature profile is denoted by T-Act. In addition to the temperature curve, the diagram of FIG. 4 also contains a graphic illustration of the switching state of the cooling. The cooling is activated and deactivated by the control unit in the manner described with regard to FIG. 3, so as to yield the rectangular curve profile of the cooler function illustrated in FIG. 4. Those portions of the cooler curve which are situated on the X axis correspond here to the deactivated state. Those portions of the cooler curve which run between the time segments with deactivated cooling correspond to the activated state Cooler (on). In these time segments with activated cooling, the temperature T-Act of the compressed air upstream of the oil filter falls and is kept within the temperature window in which the oil products condense. To keep the temperature of the compressed air in an interval in which the oil products condense but the water vapor remains dissolved in the air flow, the boundary values of the temperature interval are predefined to the controller. If the temperature T-Act of the compressed air when the cooling is activated reaches the lower boundary value T-Setpoint-Min, the control unit switches the control valve 31 (FIG. 3) into the pass-through position, such that the cooling is deactivated and the temperature T-Act rises. When the maximum value T-Setpoint-Max is reached, the control valve 31 is closed again, such that the compressed air flows through the cooler 19 and is cooled again.

The second cooler 20 downstream of the coalescence filter 10 may also be controlled in a similar way to that illustrated in FIG. 4. Here, a lower setpoint temperature is predefined and kept in the likewise predefined temperature window by activation and deactivation of the cooling.

All of the features specified in the description of the figures, in the claims and in the introductory part of the description may be used both individually and also in any desired combination with one another. The invention is therefore not restricted to the described or claimed combinations of features. In fact, all combinations of features should be regarded as being disclosed.

It will be seen that the objects set forth above, among those made apparent from the preceding description, are efficiently attained, and since certain changes may be made without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for processing compressed air for at least one pneumatic consumer, the method comprising the steps of: (i) using a controller to control a temperature of the compressed air based on at least one of a maximum temperature value and a minimum temperature value such that contaminants present in the compressed air in gaseous form condense and water mass contained in the compressed air is dissolved as steam; (ii) purifying the compressed air in a pressure line of the contaminants; and (iii) drying the compressed air.

2. The method as claimed in claim 1, wherein the temperature of the compressed air is controlled prior to the purifying.

3. The method as claimed in claim 1, wherein using the controller comprises activating a cooler when the temperature of the compressed air reaches a maximum temperature value and deactivating the cooler when the temperature of the compressed air reaches a minimum temperature value.

4. The method as claimed in claim 1, wherein the controller comprises at least one of an electronic control unit and a control valve.

5. The method as claimed in claim 1, further comprising cooling the compressed air after the purifying but before the drying.

6. The method as claimed in claim 1, wherein using the controller comprises using the controller to control the temperature of the compressed air based on both the maximum and minimum temperature values such that the temperature of the compressed air lies therebetween.

7. The method as claimed in claim 1, wherein the maximum temperature value is about 80 degrees Celsius and the minimum temperature value is about 60 degrees Celsius.

* * * * *